(12) United States Patent
O'Connor

(10) Patent No.: US 6,395,348 B1
(45) Date of Patent: May 28, 2002

(54) METHOD FOR MANUFACTURING ADHESIVE TAPES

(75) Inventor: Lawrence O'Connor, Winnipeg (CA)

(73) Assignee: KT Holdings Inc., Winnipeg (CA)

( * ) Notice: Subject to any disclaimer, the term of this patent is extended or adjusted under 35 U.S.C. 154(b) by 0 days.

(21) Appl. No.: 09/742,230

(22) Filed: Dec. 22, 2000

(51) Int. Cl.⁷ ................................................ H05H 1/00

(52) U.S. Cl. ................ 427/536; 427/172; 427/173; 427/177; 427/208.8; 427/209; 427/210; 427/286; 427/316; 427/322; 427/385.5; 427/412.1; 427/412.3; 427/412.5; 427/569

(58) Field of Search .................................. 427/536, 569, 427/172, 173, 177, 208.8, 209, 210, 256, 316, 322, 385.5, 412.1, 412.5

(56) References Cited

U.S. PATENT DOCUMENTS

| | | |
|---|---|---|
| 4,887,714 A | 12/1989 | O'Connor |
| 5,203,935 A | 4/1993 | May et al. |
| 5,520,868 A | 5/1996 | O'Connor |
| 5,730,354 A | 3/1998 | O'Connor |

*Primary Examiner*—Bernard Pianalto
(74) *Attorney, Agent, or Firm*—Adrian D. Battison; Michael R. Williams; Ryan W. Dupuis

(57) ABSTRACT

Pressure sensitive adhesive tapes are manufactured by continuously extruding polypropylene to form a web which is cooled and set and slit at transversely spaced positions into a plurality of side by side continuous tapes. After slitting each tape is drawn longitudinally and heat set to effect monoaxial orientation of the tape. A release coating to the first tape surface and a coating of a pressure sensitive adhesive to the second tape surface. Each continuous tape with the release coating and the adhesive coating thereon is wound into a series of cylindrical tape spools each containing a length of the tape.

26 Claims, 4 Drawing Sheets

METHOD FOR MANUFACTURING ADHESIVE TAPES

This invention relates to a method for manufacturing pressure sensitive adhesive tapes. Tapes according to the invention can be used for various different purposes including primarily as tear tapes but also as reinforcing tapes, where the tape consists of a layer of a plastics material which provides the required structure and a layer of adhesive on one side.

BACKGROUND OF THE INVENTION

Tear tapes for use in tearing an overwrap packaging material are used in many different packaged products. The tear tape is adhesively attached to the inside surface of the overwrap material between the overwrap material and the packaged product.

This system has been in effect for many years and for the majority of those years the tear tapes were formed of a simple mono-axially oriented plastics material supplied individually from supply spools. In some cases the plastics material carries a colorant so that the tape is of a different color from the overwrap material. On line with the overwrap material, an adhesive is applied to the tape after it is unwound from the supply spool and prior to its attachment to the overwrap material. Thus the spooled supply of the tear tape is free from adhesive and free from any release coats and is thus a simple product to manufacture formed solely by the base plastics material itself.

One technique for manufacturing a tear tape of this type involves extruding the plastics material, casting the extruded material in a wide sheet form onto a chilling surface so as to form a cast sheet, slitting the cast sheet into a plurality of individual tapes, longitudinally drawing the tapes so as to provide longitudinal or mono-axial orientation of the tapes and winding the tapes into a traverse or helically wound spool for supply to the packaging line.

As the formed tape in its wound condition comprises only the plastics material itself, it is possible to readily recycle trim waste formed during slitting of the tapes from an initial web and any waste generated during transfer of winding from one spool to the next. Such materials can simply be fed back to the extruder and re-extruded with the feed material.

Tapes of this type have been manufactured by a number of manufacturers for up to 40 years and are widely accepted.

In the late 1980's a new product was introduced in which the tape in its spooled form is supplied with a pressure sensitive adhesive already applied onto one surface of the tape. This product had the significant advantage that it was no longer necessary to apply adhesive on line with the packaging system thus avoiding the difficulty of feeding the adhesive onto the tape which may be stopping and starting with the packaging line.

The pressure sensitive adhesive tape became therefore adopted to some extent in the industry but still the majority of tear tapes are of the simple type where the adhesive is applied on line.

One disadvantage of the pressure sensitive tear tape which has reduced its acceptance is the significantly increased cost of the product. To some extent this increased cost arises due to the difficulty of manufacture.

In general pressure sensitive adhesive tear tape is manufactured by providing a wide web of the basic plastics material onto one surface of which is applied a release coat of silicone or the like and onto the other surface of which is applied a layer of the pressure sensitive adhesive which covers the surface of the web. Prior to applying the adhesive, the web is stretched to provide the necessary orientation. Some sheet materials are of a mono-axially oriented type and others are of a bi-axially oriented type. Yet further, bi-axially oriented sheet material can be additionally stretched in the longitudinal direction to further increase the longitudinal strength. Where the tapes are intended to be printed with indicia, this is applied before the adhesive on the same side as the adhesive.

Subsequent to the application of the pressure sensitive adhesive onto the sheet, the sheet is slit in a preliminary slitting process into a plurality of primary webs, each of which is then wound into a fresh supply roll. The width of the individual primary rolls must be matched with the width of the intended tapes and the number of those tapes in order that the number of tapes slit from the web equal the limited number of spooling wind-up heads available. Each primary roll is then slit in a subsequent operation to form the requisite number of tapes, following which, the tapes are individually wound into separate traverse wound spools each on a respective one of the spooling wind-up heads. This process of slitting and rewinding into primary rolls does not add value to the product so that it is simply a wasted cost. In addition, the repeated unrolling and re-rolling of the material can degrade the adhesive by exposing the adhesive to the air and by the effect of repeated contact with the release coating. Yet further, each slitting action requires a further loss of trim waste from the edges of the primary rolls so that the trim waste can in total constitute a significant proportion of the original web width at a significant cost.

This process for manufacturing the tape has a number of significant disadvantages.

Firstly it is necessary to effect slitting of the film through the layer of adhesive which is applied thereto. Slitting through adhesive is well known to be problematic in that the adhesive attaches to the slitting knife and can form balls of adhesive which can break away and interfere with the travel and processing of the tapes.

Secondly the trim waste, which is necessary at each slitting process, causes high losses in the proportion of total waste relative to the quantity of finished material leading to significantly increased material cost. Where the trim waste carries adhesive material, it is impossible to carry out a recycling process.

Thirdly in order to complete a full spool of the tear tape, it is necessary to splice together end to end the primary rolls as they are unwound, since the length of the tear tape on the spool is considerably longer than the length of the sheet on the primary roll. In the finished spool, therefore the tear tape may have a series of splices through its length and these splices are difficult to carry out due to the presence of the release coat and are often functionally problematic in the packaging line on which the tear tape is to be used. This compares unfavorably with conventional non-adhesive tear tapes which are usually splice free.

The additional slitting of primary rolls described above and also the splicing necessary for the individual primary rolls provides a significant additional cost in the process both of labor and equipment thus dramatically increasing the cost of the product relative to the conventional non-adhesive tear tape.

Despite these difficulties, the above manufacturing process has been used widely by a number of manufacturers and continues to be the pre-eminent technique which is used for manufacturing of these tapes.

One example of a tape of this type manufactured by this technique is described in U.S. Pat. No. 5,203,935 of May et al assigned to Payne Packaging Ltd. who are a significant manufacturer of the product of this type.

In view of these difficulties in manufacture, attempts have been made over a period of at least ten years to find a technique which will improve the manufacturing process to allow manufacturing of PSA tear tapes at a reduced cost.

U.S. Pat. No. 4,887,714 of the present inventor discloses a technique in which an oriented sheet of material is slit prior to the application of the adhesive so that the adhesive is applied to the individual tear tapes in a width less than the width of the tape. This technique has achieved some success and provides some advantages but has been unable to compete effectively with the conventional technique shown in the above patent of May or with the conventional non-adhesive tape.

U.S. Pat. No. 5,730,354 discloses a further improvement to the 714 patent in which the printing of indicia is applied onto the exposed surface of the adhesive. However the basic technique and manufacture of the tape is not changed.

Further attempts to improve the technique for manufacture were disclosed in U.S. Pat. No. 5,520,868 of the present inventor which discloses an arrangement in which individual tapes are separately extruded, the adhesive is applied immediately after extrusion, and the tape with the adhesive carried on the tape are then drawn longitudinally to provide the necessary orientation and to reduce the thickness of the adhesive layer. This technique has failed to achieve any commercial attention.

Tear tapes as defined herein generally have a low elongation to break which is generally of the order of 10 to 20% and certainly less than 40%. Although some specialized tear tapes are wider, the vast majority of tear tapes generally have a width less than ¼ inches and often down to ¹⁄₁₆ inch.

SUMMARY OF THE INVENTION

It is one object of the present invention, therefore, to provide an improved method of manufacturing a pressure sensitive adhesive tape which provides improved economics of manufacture and eliminates some technical problems.

According to a first aspect of the invention, therefore, there is provided a method for manufacturing pressure sensitive adhesive tapes comprising:

continuously extruding a molten plastics material to form a web which is cooled and set to form a substantially un-oriented web;

continuously forwarding the web;

passing the web as it is forwarded through a slitting assembly arranged to slit the web at transversely spaced positions into a plurality of side by side continuous tapes, each having first and second tape surfaces and two tape edges;

after slitting, drawing each continuous tape longitudinally to effect longitudinal orientation of the tape;

after drawing, heat setting each tape;

after heat setting, applying a release coating to the first tape surface;

after heat setting, applying a coating of a pressure sensitive adhesive to the second tape surface;

and continuously and separately winding each continuous tape with the release coating and the adhesive coating thereon into a series of cylindrical tape spools each containing a length of the tape.

Preferably the method includes, after heat setting and before applying the adhesive, applying printed indicia to the second tape surface;

Preferably the plastics material is polypropylene, although other materials such as polyester can be used.

Preferably the tape has a width less than ¼ inch.

Preferably the tapes have an elongation to break less than 40% and preferably of the order of 20%.

Preferably the adhesive layer is applied in a width less than the width of the tape, although it can be applied in full width if high level of adhesive is required.

Preferably, prior to applying the printed indicia to the second surface and prior to applying the release coating to the first surface, the tape surfaces are treated by corona discharge Preferably, during slitting, edge trim portions of the web are slit off and the portions returned to the extruder for re-cycling.

Preferably, security taggant material is added to the tape for use in subsequently verifying a manufacturer of the tape, the taggant material being added to the plastics material, the adhesive or the ink.

Preferably the tapes are continuously wound without loss of tape as the tape spool winding transfers from one spool to another. This can be carried out by commercially available "spool turret winders".

The tapes are traverse wound into spools either by continuous traverse movement or by intermittent traverse movement.

Preferably the tape in each spool is continuous without any splice therein.

Preferably the release coating is applied by kiss coating the tape without an impression roller so as to apply the release coating also to the edges of the tape.

According to a second method of the present invention, the method comprises:

continuously extruding a molten plastics material to form a web which is cooled and set to form a substantially un-oriented web;

continuously forwarding the web;

passing the web as it is forwarded through a slitting assembly arranged to slit the web at transversely spaced positions into a plurality of side by side continuous tapes, each having first and second tape surfaces and two tape edges;

after slitting, drawing each continuous tape longitudinally to effect longitudinal orientation of the tape;

after drawing, heat setting each tape;

after heat setting, winding each continuous tape into a spool;

simultaneously unwinding a plurality of the spools to supply the tape therefrom to a coating line;

on the coating line, applying a release coating to the first tape surface of each tape;

on the coating line, applying a coating of a pressure sensitive adhesive to the second tape surface of each tape;

and rewinding each continuous tape with the release coating and the adhesive coating thereon into a series of cylindrical tape spools each containing a length of the tape.

Preferably, during slitting, edge trim portions of the web are slit off and the portions returned to the extruder for recycling.

Preferably, during winding, portions of the tape lost between one spool and a next are drawn off and returned to the extruder for recycling.

Preferably the tape in each spool is continuous without any splice therein.

Both of these methods have the advantages that they a) allow the recycling of uncoated material directly back to the extruder;
b) avoid additional slitting processes to form narrower primary rolls, thus avoiding re-working the adhesive;
c) avoid slitting through adhesive;
d) eliminate the trim waste associated with the primary rolls process.
e) avoid splicing of the primary rolls so that the finished spool is substantially without splices; and

BRIEF DESCRIPTION OF THE DRAWINGS

Embodiments of the invention will now be described in conjunction with the accompanying drawings, in which.

In the drawings like characters of reference indicate corresponding parts in the different figures.

DETAILED DESCRIPTION

Figure 1:
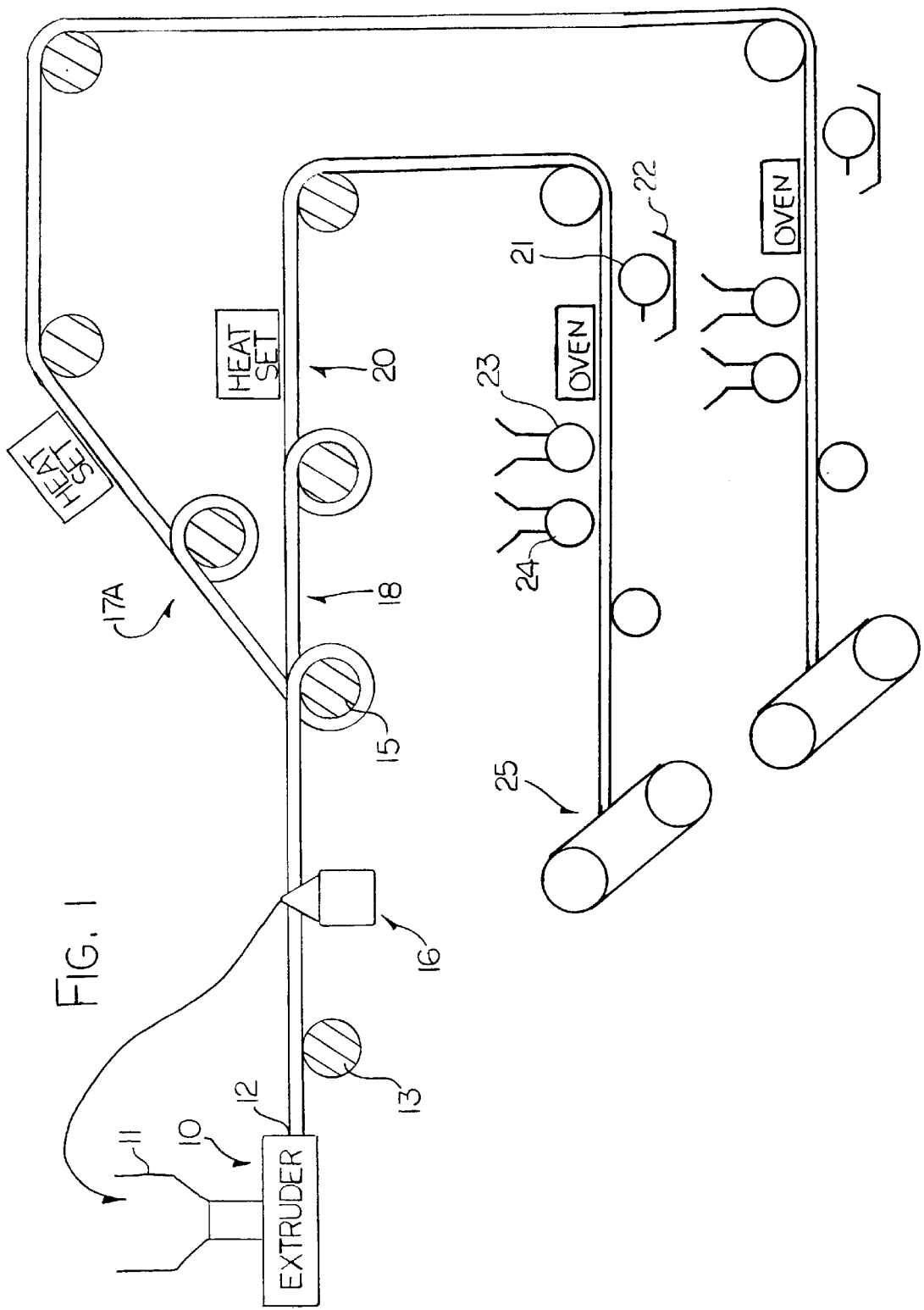
FIG. 1 is a schematic side elevational view of a first method according to the present invention.
Figure 2A:
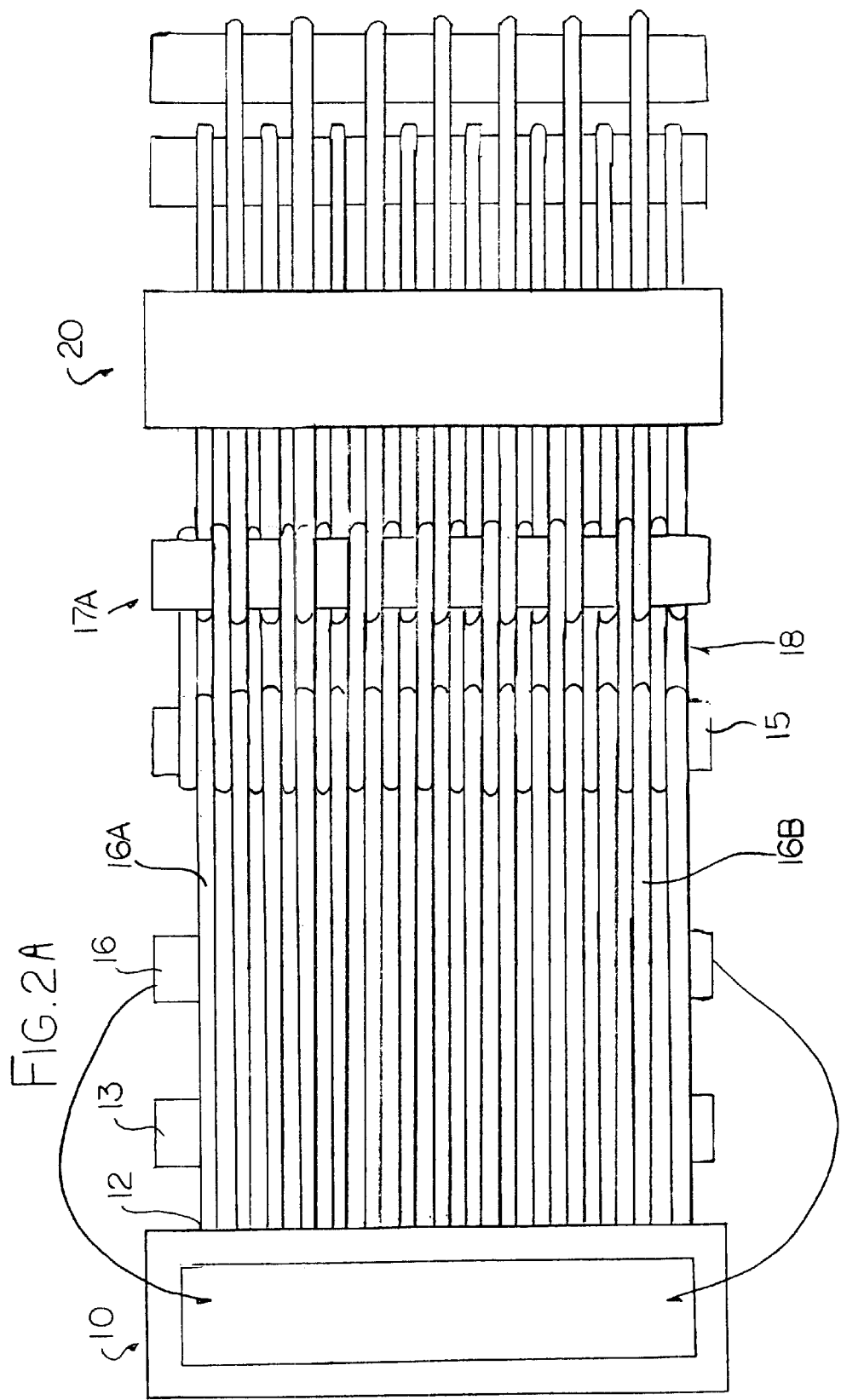
FIGS. 2A and 2B are top plan view of the first method of FIG. 1.
Figure 2B:
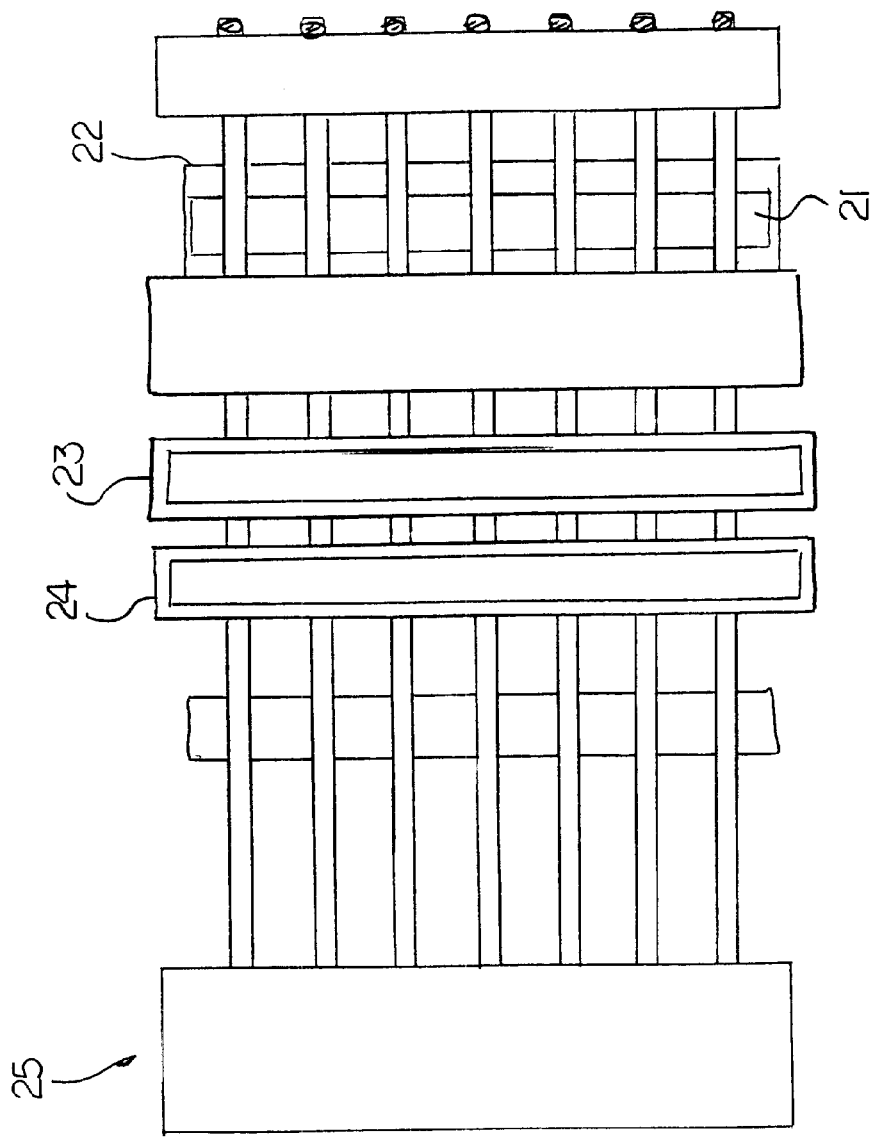

In FIGS. 1 and 2 is shown a first method of forming a tape according to the present invention. The method includes providing an extruder 10 preferred with a hopper 11 of a single plastics material preferably polypropylene. The extruder includes a pressure system which extrudes the plastics material in sheet form through a discharge mouth 12 onto a chill roll 13 so that the material is cast onto the roll to form a web or sheet of the plastics material 14 in non-oriented form.

The web is carried away from the chill roller 13 by a feed system 15 which passes the web through a slitting assembly 16 where the web is slit into a plurality of separate side by side tapes each of a width arranged to form, after drawing, a tear tape of the required width. Trim waste 16A and 16B from the web slit from the edges of the web is returned to the hopper 11 for recycling into the extruded material. The trim waste acts to trim the width of the web down to the required width for slitting into the individual tapes.

The slitting assembly can be provided by different types of slitting arrangements but preferably it forms simply a series of stationary blades since the slitting of the non-oriented material is relatively straightforward and since the material carries no adhesive at this stage.

The feed system 15 co-operates with a second feed system 17 to provide a draw zone 18 therebetween in which the tape is drawn. Thus the speed of manufacture of the web and the passage through the slitting zone can be of the order of 200 feet per minute, whereupon the speed of the tape subsequent to the draw zone 1 can be of the order of 800 feet per minute.

Subsequent to the draw zone 18, the tape is passed through a heating section 20 where the tape is heated to provide a heat setting action by which the longitudinal mono-axial orientation is heat set within the tape material. The temperature of heat setting and the specific draw ratio are well known to one skilled in the art and will depend upon the selection of the material.

At the feed assembly 15, the tapes can be separated into two or more paths indicated at 17A so that the spacing between the tapes is increased. This can be done simply by spreading the tapes by passing them over suitably spaced guides or can be carried out by providing a second path for the tapes or the alternate ones of the tapes are divided onto the second path leaving a space for alternate tapes.

The tapes are guided downstream of the heat set zone over a plurality of guide rollers with individual tape guide surfaces contacting sides of the tapes to hold the tapes in a required transverse position. The tapes are then passed over a roller 21 of a coating assembly 22 by which a release coating of a silicone or a similar material is applied to the bottom surface of the tape. The coating assembly 22 is preferably of the kiss coating type in that the tape passes across the surface of a roller in contact therewith over a shallow angle of the order of 20°. The roller runs in a bath of the liquid material to be applied to the tape and thus floods the bottom surface and the side edges of the tape so as to coat those surfaces and edges with the liquid material. Downstream of the kiss contact, the tape and/or the roller is stripped by a doctor blade so as to remove excess coating material. Downstream of the coating assembly is provided an oven for setting the coating material.

Downstream of the coating assembly and the oven is provided a first printing roller 23 which acts to apply printed indicia in a suitable ink onto the upper surface of the tape that is the surface opposite to the release coating. Downstream of the first printing roller is provided a second printing roller 24 which applies adhesive over the printed indicia onto the upper surface of the tape. The adhesive is printed or coated onto the tape either in full width across the full width of the tape or in narrow width less than the width of the tape.

Downstream of the coating arrangements, the tape is carried and guided to a winding system generally indicated at 25. The winding system is of a type which continuously winds the tape without discarding portions of the tape between one spool of the tape and the next. The tape is traverse wound into a cylindrical spool. Tape winders of this type are commercially available from Kampf in Germany and provide a turret arrangement by which each cylindrical spool is moved away from the winding location after that spool is completed so as to commence winding on a new fresh core. The transfer takes place without generating a discarded length of tape so that no tape is wasted.

Winding and coating of the tape is carried out at high speed of the order of 800 feet per minute. The process is carried out continuously so that there are no splices in the tape as it is forwarded to the winding system and no splices in the tape in each of the finished wound spools of the tape.

Figure 3:
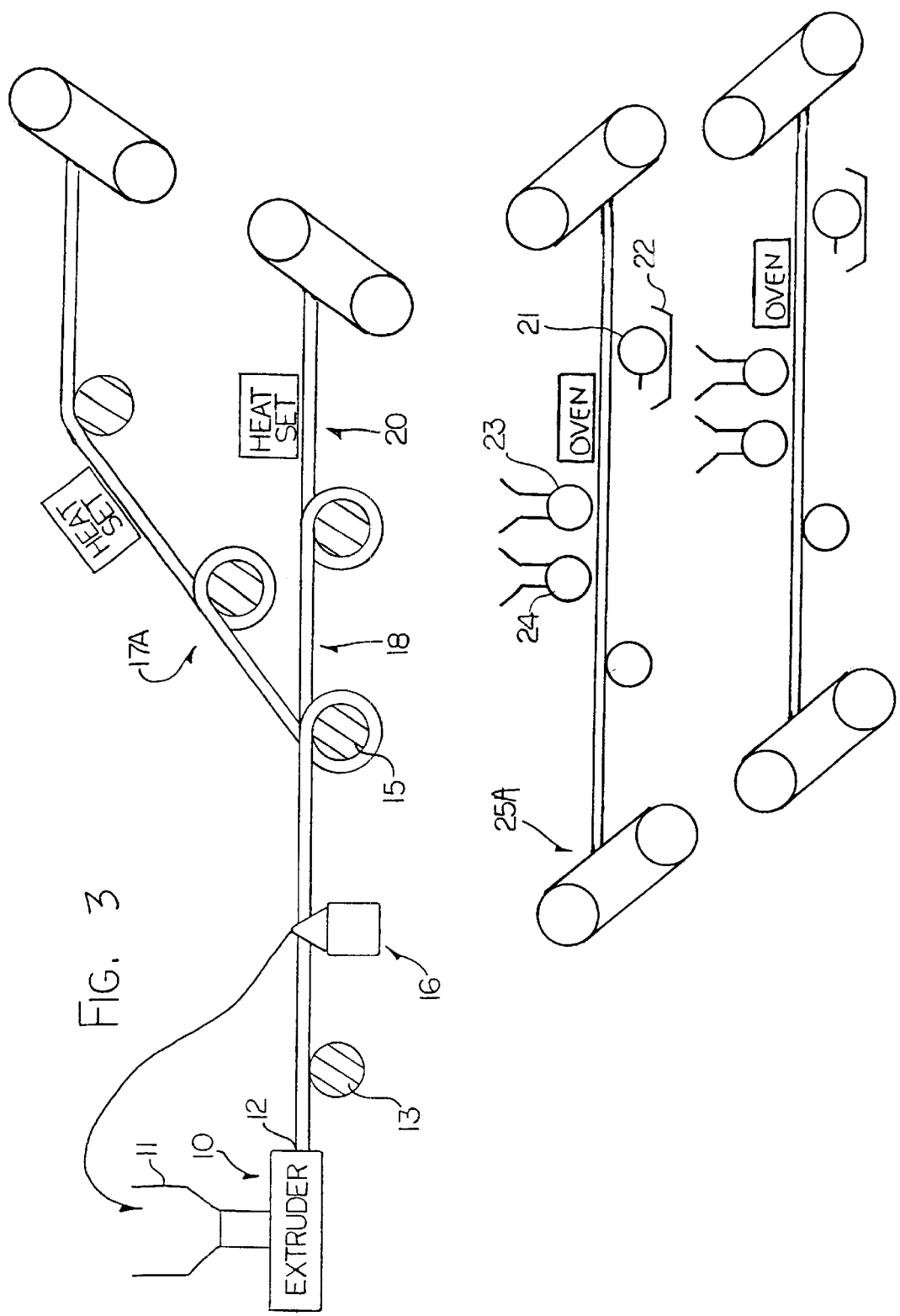
FIG. 3 is a schematic side elevational view of a second method according to the present invention.

Turning now to FIG. 3, there is shown a method which is substantially identical to that of FIG. 1 with the exception that the process is separated into two separate sections by winding each tape after heat setting into an individual spool of the tape. The winding process is again substantially continuous except that less expensive winding processes can be used since it is possible to discard portions of the tape generated as winding is transferred from a filled spool to a fresh core. The discarded portions of the tape are uncoated and thus formed solely from the polymer and thus can be returned to the hopper 11 for recycling with the primary material. Transfer of winding can therefore be effected manually.

In the second section of the process of FIG. 3, each individual wound spool is unwound and passes through the coating and rewinding section. The dimensions of the spools are arranged so that each spool from the first section is unwound and wound into a spool in the second section so that there is no necessity for splicing or cutting of the tape. In view of the additional coatings applied during the coating section, the dimensions of the spool after rewinding may be slightly different from those of the original unwound spool. As the process in the coating section can be stopped and started, there is no necessity for continuous winding in the winding section 25A.

In practice the coating and rewinding section carries a plurality of the tapes side by side so that there is a plurality of supply spools arranged at a supply section and the tapes pass side by side through the coating sections 22, 23 sand 24 to the rewinding head 25A.

In order to provide an enhanced tear tape for security purposes, a security taggant material can be added to the tape. Such materials are readily available from Secure Products L.P. of Summit, N.J. and are of a nature which fluoresce at a predetermined frequency when excited by a light source. Such taggant materials can be selected by a particular manufacturer to identify the manufacturer or a particular batch of tape so that the finished products can be analyzed by assessment of the tear tape to determine the origin of the products and any particular characteristics concerning those products.

The taggant material and can be applied into the original polymer for extrusion with the basic film or can be applied to the adhesive or the ink as a coating on the film.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method for manufacturing pressure sensitive adhesive tapes comprising:
    continuously extruding a molten plastics material to form a web which is cooled and set to form a substantially un-oriented web;
    continuously forwarding the web;
    passing the web as it is forwarded through a slitting assembly arranged to slit the web at transversely spaced positions into a plurality of side by side continuous tapes, each having first and second tape surfaces and two tape edges;
    after slitting, drawing each continuous tape longitudinally to effect longitudinal orientation of the tape;
    after drawing, heat setting each tape;
    after heat setting, applying a release coating to the first tape surface;
    after heat setting, applying a coating of a pressure sensitive adhesive to the second tape surface;
    and continuously and separately winding each continuous tape with the release coating and the adhesive coating thereon into a series of cylindrical tape spools each containing a length of the tape.

2. The method according to claim 1 wherein the orientation of the tapes is mono-axial.

3. The method according to claim 1 including, after heat setting and before applying the adhesive, applying printed indicia to the second tape surface.

4. The method according to claim 1 wherein the plastics material is polypropylene.

5. The method according to claim 1 wherein the tapes have a width less than ¼ inch.

6. The method according to claim 1 wherein the tapes have an elongation to break less than 40%.

7. The method according to claim 1 wherein the adhesive layer is applied in a width less than the width of the tape.

8. The method according to claim 1 wherein, prior to applying the adhesive to the second surface and prior to applying the release coating to the first surface, the tape surfaces are treated by corona discharge.

9. The method according to claim 1 wherein, during slitting, edge portions of the web are slit off and the portions returned to the extruder for recycling.

10. The method according to claim 1 including adding security taggant material to the tape for use in subsequently verifying a manufacturer of the tape, the taggant material being added to the plastics material, the adhesive or the ink.

11. The method according to claim 1 wherein the tapes are continuously wound without loss of tape as the tape winding transfers from one spool to another.

12. The method according to claim 1 wherein the tape in each spool is continuous without any splice therein.

13. The method according to claim 1 wherein the release coating is applied by kiss coating the tapes without an impression roller so as to apply the release coating also to the edges of the tapes.

14. A method for manufacturing pressure sensitive adhesive tapes comprising:
    continuously extruding a molten plastics material to form a web which is cooled and set to form a substantially un-oriented web;
    continuously forwarding the web;
    passing the web as it is forwarded through a slitting assembly arranged to slit the web at transversely spaced positions into a plurality of side by side continuous tapes, each having first and second tape surfaces and two tape edges;
    after slitting, drawing each continuous tape longitudinally to effect longitudinal orientation of the tape;
    after drawing, heat setting each tape;
    after heat setting, winding each continuous tape into a spool;
    simultaneously unwinding a plurality of the spools to supply the tape therefrom to a coating line;
    on the coating line, applying a release coating to the first tape surface of each tape;
    on the coating line, applying a coating of a pressure sensitive adhesive to the second tape surface of each tape;
    and rewinding each continuous tape with the release coating and the adhesive coating thereon into a series of cylindrical tape spools each containing a length of the tape.

15. The method according to claim 14 wherein, during slitting, edge portions of the web are slit off and the portions returned to the extruder for recycling.

16. The method according to claim 14 wherein, during winding, portions of the tapes lost between one spool and a next are drawn off and returned to the extruder for recycling.

17. The method according to claim 14 wherein the tape in each spool is continuous without any splice therein.

18. The method according to claim 14 wherein the release coating is applied by kiss coating the tape without an impression roller so as to apply the release coating also to the edges of the tape.

19. The method according to claim 14 wherein the orientation of the tapes is mono-axial.

20. The method according to claim 14 including, on the coating line before applying the adhesive, applying printed indicia to the second tape surface.

21. The method according to claim 14 wherein the plastics material is polypropylene.

22. The method according to claim 14 wherein the tapes have a width less than ¼ inch.

23. The method according to claim 14 wherein the tapes have an elongation to break less than 40%.

24. The method according to claim 14 wherein the adhesive layer is applied in a width less than the width of the tape.

25. The method according to claim 14 wherein, prior to applying the adhesive to the second surface and prior to applying the release coating to the first surface, the tape surfaces are treated by corona discharge.

26. The method according to claim 14 including adding security taggant material to the tapes for use in subsequently verifying a manufacturer of the tape, the taggant material being added to the plastics material, the adhesive or the ink.

* * * * *